3,448,130
PROCESS FOR PREPARING DIALKYLTIN OXIDES AND HYDROXIDES

Vincent Oakes, St. Helens, Ronald Eric Hutton, Bootle, and Brian Lawrence Tonge, London, England, assignors to Pure Chemicals Limited, Liverpool, England, a British company
No Drawing. Filed Mar. 19, 1965, Ser. No. 441,342
Int. Cl. C07f 7/22
U.S. Cl. 260—429.7      4 Claims

ABSTRACT OF THE DISCLOSURE

A process for preparing polymeric dialkylin oxides and hydroxides, which comprises reacting tin in the presence of a catalyst with alkyl or alkenyl halides having at least two halogen atoms, or a halogen atom and another substituent group, and hydrolysing the halide compounds so obtained.

---

This invention relates to a new process for the manufacture of a range of di-alkyl tin oxides and hydroxides which are mainly polymeric in nature and have various molecular weights. Such products, are useful as intermediates in the preparation of PVC stabilizers, bacteriocides, fungicides and molluscicides.

At the present time, dibutyl- and dioctyl tin salts have gained wide acceptance as stabilizers for PVC and these salts are made through dibutyl- and dioctyl-tin halide intermediates from which the corresponding oxides are obtained. Until recently, there were two principal methods for preparing the halide intermediates. The first was by reaction of stannic chloride with a Grignard reagent to form a tetra alkyl tin which could then be disproportionated with more stannic chloride to the dialkyltin dichloride. The second was by reaction of alkyl aluminum compounds with stannic chloride to form trialkyl tin monochloride which could similarly be disproportionated to the dialkyl tin chloride. Both of these methods of preparation are tedious to operate because of the number of stages involved and both make use of inflammable expensive solvents which increase both the hazards and the operating costs.

These difficulties have been overcome to a large extent by the recent development of a new method of manufacture of dialkyl tin halides direct from alkyl halides and tin. This process has been covered in British patent application No. 32,193/62.

According to the present invention, polymeric dialkyl tin oxides and hydroxides are obtained by reacting tin in the presence of a catalyst with alkyl or alkenyl halides having two or more halogen atoms, or a halogen atom and another functional group in the molecule, and hydrolyzing the halide compounds so obtained.

We have found that the choice of halogen atoms is one of the most important variables affecting the course and speed of reaction. Alkyl iodides are by far the most reactive compounds, followed by alkyl bromides, whilst with alkyl chlorides fairly drastic conditions have to be resorted to in order to effect reaction. The most satisfactory compounds in many respects are the alkyl bromides. They are much cheaper than the iodides but reaction can still be effected under relatively mild conditions which constitutes an advantage over the corresponding chlorides. For this reason most of the examples quoted utilise alkyl bromides but this must not be taken as imposing any limitation on the scope of the invention.

All compounds containing more than one halogen atom in the molecule are suitable for inclusion in this reaction. It is preferable that the halogen atoms are either primary, iso or secondary, as tertiary halogen compounds often lead to the formation of unwanted byproducts which reduces the overall yields. Compounds which we have found to be eminently suitable for inclusion in this reaction but in no way should be taken as implying any limitation on the scope of the invention are as follows: ethylene dibromide, ethylidene dibromide, ethylene tribromide, hexabromoethane, 1,3-dibromopropane, 1,4-dibromobutane, 1,4-dibromobutene, 1,5-dibromopentane, 1-chloro-2-bromoethane, bromoform, diiodoethane.

Initially a halide compound is formed, which may be polymeric or monomeric. If excess tin is used polymers corresponding to structure I may be formed, which may be either long chain polymers of cyclic structures, If, on the other hand, excess halide is used then haloalkyl compounds corresponding to Formula II are preferentially formed.

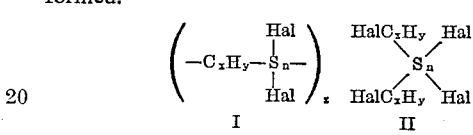

In addition to the halogen atoms which it is necessary to include in the starting compound, it is also possible to include other functional groups which would not take part in the reaction would impart specific porperties to the final product. Such functional groups include carboxyl, hydroxyl, aldehyde, ketone, ether, ester, amides, imides, mercaptan, thioether, amines, nitriles, azo, nitro, nitroso, cyano, sulphone, sulphoxide, sulphonic, sulphinic. Examples of compounds which may be used, therefore, include ethyl bromoacetate, w-bromobutyric acid, 2-bromethyl ethyl ether, 2-bromo-ethyl ethyl ketone, 2,3-dibromo-propanol, 1,2-di-(2-bromoethoxy) ethane, di(2-bromoethyl)ether, di(3-bromopropyl) ether, 2-bromoethoxy polyethoxy ethyl bromide, 2-bromopropoxy polypropoxy propyl bromide.

In the cases where only one halogen atoms is included in the molecule in addition to the functional group, polymeric materials will not normaly be formed and the principal reaction products will usually be substituted dialkyl tin halides. When more than one halogen group is present, however, the main products will be polymers.

The dialkyl tin halide compounds are converted to oxides or hydroxides by hydrolysis with caustic alkali in aqueous or alcoholic solution, or, where mild conditions are required as when using halogen compounds having functional groups which are not to be affected by the hydrolysis, with aqueous ammonium hydroxide or alkaline earth hydroxides.

It is probable that the hydrolysis of halide compounds of Formula II will give rise to polymeric oxides in which tin atoms are linked together through oxygen atoms, whereas polymeric halides of Formula I may give rise to polymeric oxides having tin atoms linked through alkyl or substituted alkyl groups and cross-linked through oxygen atoms.

It is, however, difficult to ensure that the polymeric molecules formed are identical and the end products may consist of long chain, cyclic and cross-linked polymers of varying molecular weight together with some polymers containing haloalkyl end groups. These variations in molecular weight, however, do not affect the usefulness of the product as an intermediate in the preparation of PVC stabilizers and plasticides.

A degree of control of molecular weight may be obtained by the introduction of specific quantities of alkyl mono-halides such as octyl bromide into the reaction mixture. The monohalides act as end stopping agents during the polymer formation and thereby control the molecular weight within more narrow limits. As an example, the reaction of excess tin with a mixture of 2 moles of octyl bromide and 1 mole of ethylene dibromide leads to the predominant formation of the low molecular weight polymer shown in formula.

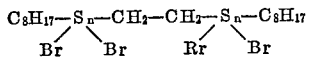

A further degree of control in this reaction can be obtained if after its completion the resulting mixture is heated, preferably at a temperature between 140° C. and 240° C., in the presence of a suitable catalyst such as aluminum chloride. The time of heating depends on the temperature chosen and this treatment leads to better distribution of the octyl and ethylene groups. Alternatively, it is also possible to bring about the same end result by heating together in the presence of a suitable catalyst an equimolar mixture of dioctyl tin dibromide and the compound formed from ethylene dibromide and tin.

The most important factor which influences the rate and course of the direct alkylation reaction is the type of catalyst chosen. Even minor amounts of catalyst are effective in bringing about reaction between the alkyl halide and tin, but more satisfactory results are attained when approximately 0.1 molar quantity per mol of tin is used. At these levels the reaction proceeds at a relatively fast rate. An increased rate can be achieved by increasing the catalyst quantities beyond this level but, as in many instances the catalyst is lost during the work-up procedure, the use of increased quantities leads to higher costs.

Catalysts which are suitable for bringing about this reaction include amines, organic sulphoxides and sulphones, organic phosphites, organic phosphines, and metallic halides together with organic compounds which are Lewis bases.

An organic Lewis base is a compound capable of donating two electrons to a metal. It therefore serves as a chelating agent, the metal halides serving as Lewis acids which will accept the organic Lewis bases. For example, we have shown that alcohols, polyethylene glycols, mercaptans, esters, organic phosphites, organic phosphines, ketones, ethers, amines, nitriles, sulphoxides, sulphones and thioethers are capable of forming the desired complex.

The above classes of compounds must only be taken as examples of the type of grouping which is satisfactory for the formation of the desired catalyst complex and must in no way be taken as imposing limitation on the scope of the invention. Naturally, some of these compounds behave more efficiently than others and preference will be given in many of the examples quoted to the use of certain compounds which, in our own experience, have proved to be the most effective. Compounds which we have shown to be particularly effective in this respect are the organic phosphites and phosphines and in particular triphenyl phosphite, organic sulphoxides and tertiary amines.

The more effective group of chelators are those which contain more than one chelating group in the same molecule especially if they are two or three carbon atoms distant from each other. Furthermore, we have found that it is also advantageous if the two chelating groups in the same molecule possesses different chelating power. Thus, for example, acetonyl acetone is a suitable chelating agent for this reaction but because the ketonic group is a powerful chelating group, and this compound contains two such groups, it is not entirely suitable. Examples of more suitable products are:

β-acetyl diethyl ether which contains 1 ketonic and 1 ether group.
β-methoxy propionitrile which contains 1 ether and 1 nitrile group.
β-ethoxy ethyl acetate which contains 1 ether and 1 carbonyl group.

These three compounds, together with other similar compounds which also contain two chelating groups of different chelating power, are amongst the most effective catalysts for this reaction.

The metal halide used in conjunction with the compound containing a chelating group may be added to the reaction mixture as such or it can be allowed to form in situ from added metal or other metallic salt such as an alkoxide. Thus, for example, if lithium metal is added to the reaction mixture there is normally sufficient decomposition of the alkyl halide to form lithium halide which in turn can form the catalyst complex by reaction with the organic chelating compound.

Although lithium has been quoted as the desired metal in the above example for the formation of the complex, it should not be inferred that it is only this metal which is capable of formation of a suitable complex. We have found that lithium probably forms the most powerful complexes, but we have also shown that sodium, potassium, magnesium, zinc, mercury, cadmium and aluminum will also form suitable catalysts. From the fact that such a wide range of metals are suitable for this reaction, it can be inferred that all metals within groups 1, 2 and 3 of the periodic table are effective. As a general rule it might be stated that those of small atomic radius which tend towards complex formation more easily are the most effective metals.

With the more powerful groups of catalysts such as the organic sulphoxides, tertiary amines, organic phosphites and phosphines, we have found that it is not necessary to add an additional metal in order to bring about fast reaction, as with these classes of compounds the chelating agent is so powerful that an active complex can be formed from the compounds with the small amount of tin bromide which is formed during the course of the reaction.

It is also possible to preform complexes between say a metallic or alkyl halide and a phosphite and then add these to the alkyl halide and tin reaction mixture. This will also bring about reaction but does not appear to constitute any advantage over adding the ingredients separately to the reaction mixture.

Thus, from the above comments it can be established that the two most important variables affecting the course and rate of reaction are first the choice of alkyl halide and secondly the choice of catalyst.

A further variable is the temperature of reaction but in our experience this appears to be relatively unimportant as we have obtained reaction at temperatures as low as 100° C., altthough we have found that it is preferable to effect reaction between 140° C. and 170° C.

Another important variable is the physical form of the tin. Reaction can be effected using widely differing forms of tin from powder to large blocks and we have found that there is a relationship between the available surface area of the tin and the rate of reaction. For most purposes, we have found that commercially available granulated tin is suitable.

Because of the extreme simplicity of this reaction, it can be adapted for either batch type production methods or for continuous operation.

Examples of several preparations which lie within the scope of the invention have been appended below but must in no way be taken as imposing any limitation.

EXAMPLE 1

Granulated tin (59.4 gms.), ethylene dibromide (94 gms.), triphenyl phosphite (15.4 gms.) and chlorobenzene (50 gms.) were refluxed together for 40 hours. The small quantity of unreacted tin was then removed by filtration and the filtrate stripped of unreacted ethylene dibromide and chlorobenzene. The resulting viscous residue, which was a polyethylene tin dibromide, was dissolved in alcohol and the solution added to alcoholic caustic soda. The polymeric organotin oxide was immediately precipitated in high yield. This was removed by filtration, washed with water and dried and so obtained as a white powder.

EXAMPLE 2

Granulated tin (29.7 gms.), 1,3-dibromopropane (151.4 gms.) and triphenyl phosphite (7.6 gms.) were stirred together at 150° C. for 16 hours. The reaction mixture was then filtered to remove the small quantity of unreacted tin and the filtrate heated under reduced pressure to remove excess 1.3 dibromo propane. The resulting viscous polymeric residue was dissolved in alcohol and added to alcoholic caustic soda so as to precipitate the corresponding organotin oxide as a white powder which could be removed by filtration.

EXAMPLE 3

Granulated tin (29.7 gms.), 1.5 dibromopentane (172.5 gms.) and triphenyl phosphite (7.7 gms.) were reacted at 155° C. for 18 hours. The mixture was then filtered to remove some unreacted tin and the filtrate then heated under reduced pressure so as to strip off excess 1,5-dibromopentane. The resulting polymeric organotin bromide residue was dissolved in alcohol and hydrolysed by addition of alcoholic caustic soda. The corresponding polymeric organotin oxide was afforded as a white powder.

EXAMPLE 4

In a similar manner to Example 1, ethylene dibromide was reacted with tin but the triphenyl phosphite catalyst was replaced by lithium (0.2 gms.) and ethoxy ethanol (10 gms.). The reaction took the same course as that described in Example 1 although the amount of unreacted tin obtained at the end was slightly higher. The final product was a similar polymeric organotin oxide to that obtained in Example 1.

EXAMPLE 5

In a similar manner to Example 3, 1.5 dibromopentane was reacted with tin but in this case the triphenyl phosphite catalyst was replaced by sodium (0.5 gms.) and butanol (10 gms.). The reaction rate was much slower but the final product appeared to be identical to the polymeric tin oxide obtained in Example 3.

EXAMPLE 6

Granulated tin (29.7 g.), 1,3-dibromopropane (151.4 g.) cadmium metal (1.12 g.) and ethoxyethanol (6.1 g.) were heated together at 150° C. for 32 hours. Excess tin was removed by flotation techniques with a hydrocarbon solvent; the solvent was removed under reduced pressure and the semi-solid residue was hydrolysed by alcoholic sodium hydroxide. The precipitated organotin oxide was collected by filtration and dried in air.

EXAMPLE 7

Granulated tin (29.7 g.) and 1,3-dibromopropane (151.4 g.) was treated with the product resulting from the reaction of sodium (0.28 g.) and ethoxy ethyl acetate (20.0 g.). The resulting mixture was stirred at 155° for 8 hours. After removal of unreacted tin, the product was worked up as in Example 6.

EXAMPLE 8

Granulated tin (29.7 g.), 1,5-dibromopentane (172.5 g.), mercury (2.5 g.) and triphenyl phosphite (7.7 g.) were heated together for 24 hours. Unreacted tin was removed and the excess alkyl halide removed by distillation under reduced pressure. The oily residue was hydrolysed with hot alcoholic sodium hydroxide washed with water, filtered and dried to yield the required polymeric organotin oxide as a white solid.

EXAMPLE 9

In a similar manner to Example 3; 1,5-dibromopentane was reacted with tin and triphenyl phosphite using magnesium phenoxide (2.0 g.) as co-catalyst. The reaction took the same course as that described in Example 8. The final product was a similar polymeric organotin oxide obtained in high yield.

EXAMPLE 10

Granulated tin (59.4 g.) was reacted with 1,10-dibromodecane (150 g.) in the presence of tributylamine (10 g.) and aluminum tert.-butoxide (2.0 g.), at 150° for 24 hours. Little tin remained unchanged at the end of this period, and so the whole mixture was heated with alcoholic aqueous alkali, steam-distilled under reduced pressure and centrifuged. The white solid residue was washed with water, centrifuged and dried in air to yield the polymeric organotin oxide.

EXAMPLE 11

Granulated tin (59.4 g.), ω-bromobutyric acid (170 g.) and triphenyl phosphine (15 g.) were mixed together, and the mixture heated to 155° for 24 hours. The whole mixture was treated with an excess of aqueous ammonium hydroxide at room temperature, washed well with water, separated from metallic impurities by flotation, centrifuged, washed and dried in vacuo. The white solid product was the desired organotin oxide.

EXAMPLE 12

Granulated tin (59.4 g.), 3-bromopropane (150 g.) and triphenyl phosphine (15 g.) were heated at 150° for 10 hours, when all the tin had reacted. The product was hydrolysed with aqueous sodium hydroxide to yield a creamy-white solid organotin oxide.

EXAMPLE 13

Granulated tin (59.4 g.), p-(2-bromoethyl) benzaldehyde (215 g.) and tributylamine (14 g.) were heated together at 150° C. for 24 hours. The product was separated from unreacted tin residues and purified by extraction with benzene followed by steam distillation under reduced pressure. The semi-solid product was hydrolysed with aqueous ammonium hydroxide as in Example 11 to yield the desired organotin oxide.

EXAMPLE 14

Tin flitters (59.4 g.), 5-bromopentan-2-one (175 g.) and tributylamine (14 g.) were reacted substantially as in Example 13. The product was purified by similar physical techniques and hydrolysed to a buff-colored organotin oxide in high yield.

EXAMPLE 15

Tin flitters (59.4 g.), bis (2-bromoethyl) sulphide (380 g.) tributylamine (14 g.) and lithium bromide (2 g.) were heated in chlorobenzene (200 g.) at 150° for 24 hours. The product was decanted from unreacted tin, evaporated under reduced pressure and the resultant alkyltin bromide mixture carefully hydrolysed with dilute aqueous barium hydroxide. The product was the desired off-white organotin oxide polymer.

EXAMPLE 16

Tin flitters (59.4 g.), dimethyl 4-bromobutylamine (180 g.) dimethylformamide (10 g.) and chlorobenzene (200 g.) were reacted substantially as in Example 15. The product was also isolated by a similar procedure to yield the desired polymeric organotin oxide in high yield.

EXAMPLE 17

Granulated tin (59.4 g.), ω-bromoacetonitrile (160 g.) and triphenyl phosphine (15 g.) were heated under reflux for 16 hours, when most of the tin had reacted. The product was separated from metallic residues, evaporated under reduced pressure and hydrolysed by careful treatment with dilute aqueous alkali. The cream colored solid product was the desired polymeric alkyltin oxide.

EXAMPLE 18

Tin flitters (59.4 g.), bis (2-bromoethyl) sulphone (310 g.) and tributylamine (20 g.) were reacted in chlorobenzene (200 g.) substantially as in Example 15. The product was worked up as before to yield a pale brown solid substituted organotin oxide.

EXAMPLE 19

Ethyl bromoacetate (334 g.) was added to granulated tin (59.4 g.) and triphenyl phosphine (15 g.). The mixture was refluxed for 24 hours, cooled, centrifuged and the product converted to the corresponding organotin oxide by mild hydrolysis with caustic soda.

EXAMPLE 20

Granulated tin (59.4 g.), 2-bromoethyl ethyl ether (306 g.) and tributyl amine (10 g.) were heated together at 100° C. for 48 hours. After which period only a small amount of unreacted tin remained. The resulting viscous oil was hydrolysed by treatment with hot alcoholic caustic soda and the derived organotin oxide was obtained in almost quantitative yields.

EXAMPLE 21

Granulated tin (59.4 g.) N (2-chloroethyl) phthalimide (210 g.) and triphenyl phosphite (15.4 g.) were heated together in chlorobenzene (200 g.) until only a small amount of unreacted tin remained. The resulting product which was the organotin dichloride was formed as a white solid which could be removed from the unreacted tin by flotation. The dichloride was hydrolysed with ammonium oxide as in Example 11 to give the polymeric organotin oxide.

EXAMPLE 22

In a similar manner to Example 21 N (2-chloroethyl) phthalimide was reacted with tin using dimethyl formamide (20 g.) as catalyst. Substantially similar results were obtained.

EXAMPLE 23

In a similar manner to Example 20, granulated tin (59.4 g.) and bis(2-bromoethyl) ether (115 g.) in chlorobenzene (200 g.) and tributyl amine (10 g.) were heated together for 48 hours. The resultant polymeric organotin bromide was continuously formed as a white precipitate which could be removed by flotation and hydrolysed with caustic soda as under mild conditions to give the polymeric oxide.

EXAMPLE 24

Tin flitters (29.7 g.), 1,5-dibromopentane (72.5 g.), octyl bromide (70 g.) and triphenyl phosphite (10 g.) were reacted at 150° C. for 24 hours. The mixture was separated from unreacted tin, stripped under reduced pressure and the resulting polymeric organotin bromide residue hydrolysed with alcoholic alkali. The resulting white powdered solid was the desired octyl end-stopped organotin oxide.

EXAMPLE 25

In a similar manner to Example 24, 1,10-dibromodecane (150 g.) was reacted with granulated tin (59.4 g.) and octyl bromide (40 g.), but the catalyst was replaced by trioctylamine (25 g.). The reaction was complete after 20 hours at 155°, little tin remaining unchanged. The product was worked up in a similar manner to yield the desired organotin oxide.

EXAMPLE 26

Granulated tin (59.4 g.) 2,2'-dibromodiethyl ether (130 g.) and triphenyl phosphite (20 g.) were heated together in chlorobenzene (200 g.), at reflux temperatures for 30 hours. The product was separated from unreacted tin and evaporated to dryness. The residue was dissolved in alcohol and heated with alcoholic alkali until hydrolysis was judged to be complete. The resulting polymeric organotin oxide was washed with water, centrifuged off and dried to yield the desired product.

EXAMPLE 27

Granulated tin (59.4 g.), ω-dibromopolyoxyethylene ether 1000 (500 g.) and triphenyl phosphite (30 g.) were heated together for 30 hours at 145° in the presence of tributylamine (5 g.). The product was isolated, after removal of unreacted tin, by washing with ether and alcohol and hydrolysing the polymeric organotin halide was alcoholic alkali. This procedure gives the organotin oxide in high yield.

What is claimed is:

1. A process for the production of dialkyltin oxides and hydroxides, which comprises reacting tin, in the presence of a catalyst selected from the group consisting of organic phosphites, organic phosphines, organic sulphoxides, organic sulphones, tertiary amines, amines capable of forming tertiary amine in situ under the conditions of the reaction, and metallic halides in conjunction with organic compounds which are Lewis bases, with a substance selected from the group consisting of alkyl and alkenyl halides having at least two halogen atoms and alkyl and alkenyl halides having one halogen atom and another substituent selected from aldehyde, ketone, amine, nitrile, sulphone, ether, imide, and hydroxy groups, and hydrolysing the halide compounds so obtained.

2. A process as claimed in claim 1, in which the reactants are heated together to 100–170° C.

3. A process as claimed in claim 1, in which the organic Lewis base used as a catalyst component is selected from the group consisting of alcohols, mercaptans, esters, ketones, ethers, thioethers, nitriles, amines, organic phosphites, organic phosphines, organic sulphoxides and organic sulphones.

4. A process as claimed in claim 1, in which the metallic halide used as a catalyst component is selected from the group consisting of lithium, sodium, potassium, magnesium, zinc, mercury, cadmium and aluminium.

References Cited

UNITED STATES PATENTS 3,085,102  4/1963  Yatagai et al. _____ 260—429.7

OTHER REFERENCES

Gilman et al., J. of Organic Chem., vol. 16, (1951), pages 473 and 474.

Dub, Organometallic Compounds, vol. II, (1963), p. 182.

TOBIAS E. LEVOW, *Primary Examiner.*

W. F. W. BELLAMY, *Assistant Examiner.*